(No Model.)

R. LANGHANS.
INCANDESCENT LAMP.

No. 516,892. Patented Mar. 20, 1894.

Witnesses
Jas. J. Maloney.
M. E. Hief.

Inventor.
R. Langhans,
by Jos. P. Livermore,
Att'y.

UNITED STATES PATENT OFFICE.

RUDOLF LANGHANS, OF BERLIN, GERMANY.

INCANDESCENT LAMP.

SPECIFICATION forming part of Letters Patent No. 516,892, dated March 20, 1894.

Application filed April 18, 1892. Serial No. 429,690. (No model.)

*To all whom it may concern:*

Be it known that I, RUDOLF LANGHANS, of Berlin, Kingdom of Prussia, Germany, have invented an Improvement in Incandescent Lamps, of which the following description is a specification.

This invention is embodied in an incandescing lamp and relates especially to the conducting or leading-in wires by which the incandescing filament inside the exhausted glass bulb is connected with the conductors of the external circuit by which the current is supplied to the lamp.

Figure 1:
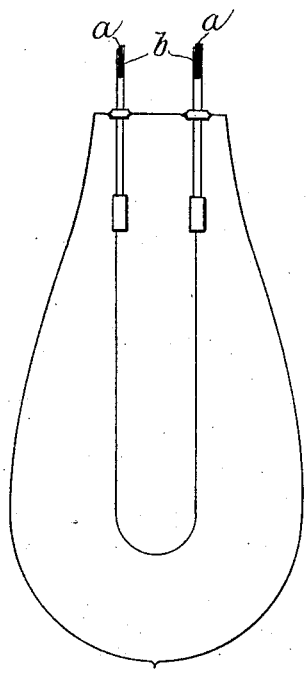
Figure 2:

Figure 1 shows in side elevation partly in section an incandescent lamp provided with leading in wires embodying this invention, and Fig. 2 a transverse section on a larger scale of one of the leading in wires.

The object of the invention is to reduce the expense of the leading-in wires which constitutes a considerable item in the cost of an incandescing lamp. It is necessary that the leading-in wires should expand and contract by changes in temperature substantially equally with the glass surrounding them, and they must make an air-tight joint with the glass. Of all the metals heretofore employed for the leading-in wires platinum is the only one which completely fulfills the above conditions, since its co-efficient of (thermal) expansion up to 100° centigrade is .000008842, and at 300° centigrade .000009183, whereas the co-efficient of expansion of the glass employed for the lamps is .000008710 and .000010700 at the above temperatures. In addition the glass is capable of adhering closely to the platinum.

I have discovered that the metals belonging to the so-called magnetic group, that is, iron, nickel, and cobalt, one or more alloyed with antimony, may be used as a basis for the leading-in wires, as said metals of the magnetic group have a co-efficient of expansion by heat approximately equal to that of the glass employed for the lamps, and by alloying with the proper proportion of antimony, the resulting alloy has substantially the same co-efficient of expansion as platinum and the invention consists in a lamp provided with a leading-in wire, the main portion or basis of which is composed of an alloy of one or more of the said magnetizable metals, with antimony, the said core being surrounded and enveloped by a coating of platinum which protects the surface of the wire against oxidation and adheres closely to the glass into which the wire is sealed, so as to afford a tight joint by which the vacuum in the lamp bulb may be maintained.

Iron having a co-efficient of expansion of .00001182 alloyed with antimony having a co-efficient of expansion of .00001083, or nickel with a co-efficient of expansion of .00001286 alloyed with antimony forms a convenient and efficient material for the core of the leading in wire. Antimony cannot be employed alone owing to its low melting point and its tendency to break. Owing, however, to the fact that the co-efficient of expansion of an alloy is the mean of the co-efficients of the metals composing it, the antimony is an important factor for lowering the co-efficients of expansion of iron and nickel the alloy of said metals with antimony having a coefficient of expansion approximating more closely to that of glass and platinum than when unalloyed with antimony; in such alloys, however, the amount of nickel or iron must considerably exceed that of the antimony in order to produce a sufficiently strong material, say from one to five per cent. of the alloy may be antimony, so that in such alloy the main component is of the group of magnetic metals.

In order to produce the leading-in wire according to my invention, a wire having a core or body *a* composed of one of these alloys is provided with a covering *b* of platinum which may be effected by proceeding as follows:—A carefully cleaned rod or wire composed of an alloy of iron, or nickel, or cobalt, or any two or all three of them with antimony, is firmly pressed into a platinum tube and the compound wire thus obtained is put through a draw bench and drawn down to the required thickness. In order to produce the best results the core and covering of platinum should be intimately united or welded together, which can be done by heating the platinum covered wire to a welding heat. Such heating may be produced by passing a sufficiently great electric current through the wire, or in any other suitable manner. Wires thus prepared may be sealed into the glass employed for lamps, in a thoroughly air-tight and durable manner, and by this means I can effect a very considerable saving of platinum. The filament can be attached to these wires in any well-known or convenient manner.

The hereinbefore given co-efficients of expansion are taken from Matthieson's tables.

The term iron herein used includes also steel, but as iron can much more readily be manipulated in the manufacture it is more desirable to use the former.

The choice of the metals of the alloy, will depend upon the character of the glass, as different kinds of glass vary somewhat in expansibility, and the alloy approximating most closely to the expansibility of the glass will give the best result.

Having particularly described and ascertained the nature of my invention and in what manner the same is to be performed, I declare that what I claim is—

1. An exhausted lamp bulb provided with leading-in wires sealed into the same consisting of a core or body of an alloy of one or more of the magnetizable metals (i. e. iron, nickel, cobalt) with antimony, and a coating of platinum enveloping the same, substantially as described.

2. An exhausted lamp bulb provided with leading-in wires sealed into the same, consisting of a core or body of an alloy of one or more of the magnetizable metals, (i. e. iron, nickel, cobalt) with antimony, and a coating of platinum enveloping the same, and united thereto by welding substantially as described.

In testimony whereof I have signed my name to this specification in the presence of two subscribing witnesses.

RUDOLF LANGHANS.

Witnesses:
E. F. VON WILMOWSKY,
JOS. P. LIVERMORE.